US012736388B2

(12) United States Patent
Bergmann et al.

(10) Patent No.: US 12,736,388 B2
(45) Date of Patent: Sep. 15, 2026

(54) RADAR-OPERATED FILL LEVEL MEASURING DEVICE

(71) Applicant: Endress+Hauser SE+Co. KG, Maulburg (DE)

(72) Inventors: Eric Bergmann, Steinen (DE); Klaus Feißt, Stegen (DE)

(73) Assignee: Endress+Hauser SE+Co. KG, Maulburg (DE)

(*) Notice: Subject to any disclaimer, the term of this patent is extended or adjusted under 35 U.S.C. 154(b) by 215 days.

(21) Appl. No.: 18/708,377

(22) PCT Filed: Nov. 21, 2022

(86) PCT No.: PCT/EP2022/082655
§ 371 (c)(1),
(2) Date: May 8, 2024

(87) PCT Pub. No.: WO2023/099267
PCT Pub. Date: Jun. 8, 2023

(65) Prior Publication Data

US 2025/0003785 A1 Jan. 2, 2025

(30) Foreign Application Priority Data

Nov. 30, 2021 (DE) ..................... 10 2021 131 499.2

(51) Int. Cl.
*G01F 23/284* (2006.01)
*G01S 13/88* (2006.01)
*H01Q 1/22* (2006.01)

(52) U.S. Cl.
CPC ............ *G01F 23/284* (2013.01); *G01S 13/88* (2013.01); *H01Q 1/225* (2013.01)

(58) Field of Classification Search
CPC ........ G01F 23/284–2845; G01S 13/88; H01Q 1/225
See application file for complete search history.

(56) References Cited

U.S. PATENT DOCUMENTS 5,955,684 A * 9/1999 Gravel ................ H01R 13/527 73/866.5
2012/0186339 A1* 7/2012 Feisst ...................... G01S 13/88 73/290 V (Continued)

FOREIGN PATENT DOCUMENTS

CN 202522291 U 11/2012
DE 102004060117 A1 5/2007

(Continued)

*Primary Examiner* — Matthew M Barker
(74) *Attorney, Agent, or Firm* — Mark A. Logan; Endress+Hauser (USA) Holding, Inc.

(57) ABSTRACT

A temperature resistant and compactly designable fill level measuring device comprises a housing; arranged in the housing, a transmitting/receiving unit, which produces radar signals and, based on corresponding received signals, determines fill level; an antenna for transmitting transmitted radar signals to a fill substance and for receiving received signals after reflection on a surface of the fill substance; and a measuring device neck arranged between the antenna and the housing and containing, extending in the measuring device neck, a hollow conductor, via which signals are led between the transmitting/receiving unit and the antenna. A thermal coupling element couples the hollow conductor thermally with the measuring device neck. In this way, the transmitting/receiving unit is thermally decoupled from the container. This enables a compact construction of the measuring device neck, and of the fill level measuring device, a compact construction which satisfies both thermal as well as also mechanical requirements.

7 Claims, 3 Drawing Sheets

(56) References Cited

U.S. PATENT DOCUMENTS

| | | | | |
|---|---|---|---|---|
| 2015/0168202 | A1* | 6/2015 | Blodt | G01F 23/296 73/290 V |
| 2019/0033117 | A1* | 1/2019 | Stobart | H01Q 1/225 |
| 2019/0331518 | A1* | 10/2019 | Ohlsson | G01F 23/284 |
| 2020/0088562 | A1* | 3/2020 | Feisst | G01S 13/88 |
| 2020/0235452 | A1 | 7/2020 | Kienzle et al. | |
| 2021/0293602 | A1* | 9/2021 | Pankratz | H01Q 19/08 |

FOREIGN PATENT DOCUMENTS

| | | | |
|---|---|---|---|
| DE | 102009028620 | A1 | 2/2011 |
| DE | 102012103493 | A1 | 10/2013 |
| DE | 102018117164 | A1 | 1/2020 |
| DE | 102018129357 | A1 | 5/2020 |
| EP | 3686566 | A1 | 7/2020 |
| WO | 2020160777 | A1 | 8/2020 |

* cited by examiner

RADAR-OPERATED FILL LEVEL MEASURING DEVICE

CROSS-REFERENCE TO RELATED APPLICATIONS

The present application is related to and claims the priority benefit of DPMA Patent Application No. 10 2021 131 499.2, filed on Nov. 30, 2021, and International Patent Application No. PCT/EP2022/082655, filed Nov. 21, 2022, the entire contents of which are incorporated herein by reference.

TECHNICAL FIELD

The invention relates to a temperature-stable and compactly designable fill level measuring device.

BACKGROUND

In process automation technology, field devices are applied for registering process parameters. For the purpose of registering particular process parameters, suitable measuring principles are implemented in corresponding field devices, in order to register as process parameter, for instance, a fill level, a flow, a pressure, a temperature, a pH value, a redox potential or a conductivity. The most varied of field device types are manufactured and sold by the Endress+Hauser group of firms.

For fill level measurement of fill substances in containers, contactless measuring methods have proven themselves, since they are robust and require low-maintenance. Another advantage of contactless measuring methods is their ability to measure fill level virtually continuously. For continuous fill level measurement, primarily radar based measuring methods are applied (regarding the invention, the terminology, "radar" refers to signals, e.g. electromagnetic waves, having frequencies between 0.03 GHz and 300 GHZ). In such case, in principle, higher frequencies yield higher measuring-resolutions. Established measuring methods are the pulse travel time method and the FMCW ("Frequency Modulated Continuous Wave") method. Further details concerning radar based fill level measurement are described, for example, in "*Radar Level Detection*, Peter Devine, 2000".

The antenna of radar based, fill level measuring devices is placed in direct contact with the interior of the container, since no radar impeding barriers should exist between the antenna of the fill level measuring device and the fill substance. In the interior of the container, however, there are, depending on application, difficult conditions, such as high temperatures, high pressure and/or dangerous gases. Therefore, the transmitting/receiving unit is, in appropriate cases, kept thermally encapsulated from the antenna in a measuring device neck. Especially in the case of radar based, fill level measuring devices, in whose transmitting/receiving unit radar frequencies of 60 GHz or higher are implemented, the radar signal must be led to the antenna via a hollow conductor extending centrally in the measuring device neck. Since the inner diameter of the hollow conductor needs to be dimensioned very small with increasing frequencies, especially from 60 GHz on up, the wall thickness of the hollow conductor must be constructed correspondingly large, in order to assure an sufficient mechanical stability, e.g. vibration resistance. Therefore, it is necessary to design the hollow conductor, and the measuring device neck, correspondingly long, in order to keep the thermal resistance of the hollow conductor large, such that heat flux is minimized and the transmitting/receiving unit is thermally decoupled. This is contrary, however, to the frequent need to construct the fill level measuring device compactly.

SUMMARY

An object of the invention, therefore, is to provide a compact and, at the same time, thermally well insulated, radar-based fill level measuring device.

The invention achieves this object by a fill level measuring device for determining a fill level of a fill substance in a container, comprising:

- a housing,
- arranged in the housing, a transmitting/receiving unit, which is designed to produce transmitted radar signals and, based on corresponding received signals, to determine fill level,
- an antenna for transmitting transmitted radar signals to the fill substance and/or for receiving received signals received after reflection on a surface of the fill substance, and
- a measuring device neck arranged between the antenna and the housing and containing, extending in the measuring device neck, a hollow conductor, via which signals are led between the transmitting/receiving unit and the antenna.

In such case, the fill level measuring device is characterized by a thermal coupling element, which couples the hollow conductor extending in the measuring device neck thermally with the measuring device neck. This increases a decoupling of the transmitting/receiving unit thermally from the container. In this way, an especially compact construction of the measuring device neck, and of the fill level measuring device, can be achieved, while nevertheless satisfying both thermal as well as also mechanical requirements.

Applied for implementing the coupling element can, in principle, be any thermally well conducting material, such as e.g. metal (stainless steel, aluminum, etc.), however, also, for example, thermally sufficiently conductive ceramics (aluminum oxide ceramics) or plastics filled with thermally conductive particles. Decisive, in such case, is that the coupling element has a correspondingly small thermal resistance, which preferably amounts to a maximum of 15 K/W. The position of the coupling element along the axis of the measuring device neck is, in principle, freely selectable. Advantageously however, the coupling element is arranged at an end region of the hollow conductor, and of the housing-neck, facing toward, or away from, the transmitting/receiving unit, since it is most effective at either of these tube positions.

The transmitting/receiving unit is especially efficiently thermally decoupled, when the coupling element and the surface of the housing each have a thermal resistance, which when summed together amounts at most to a fifth of thermal resistance of the transmitting/receiving unit toward the housing. For this, outside of the coupling element, the sum of the two cross sectional areas of the device neck and the hollow conductor are kept as small as possible, in order that their thermal resistances, in sum, and the corresponding thermal insulation toward the transmitting/receiving unit, are kept as large as possible. Accordingly, the hollow conductor can be so designed that, except for the coupling element, it is thermally insulated from the measuring device neck. Since also the thermal resistance of the housing influences the temperature in the housing interior, it is, moreover, advantageous that the housing has a thermal resistance amounting to 5 K/W maximum.

The invention can, additionally, be developed further, by having the coupling element produce not only a thermal connection to the measuring device-neck, but also a securement of the hollow conductor in the measuring device neck. For this, the coupling element and the measuring device neck can comprise, for example, corresponding screw threads, by means of which the hollow conductor is securable in the measuring device neck.

Due to the filigreed design of the hollow conductor, the concept of the invention as regards compact construction is especially advantageous when the transmitting/receiving unit produces radar signals having a frequency of 60 GHz or higher, and when it processes corresponding received signals. In such case, "unit" means in the context of the invention, in principle, any arrangement, or encapsulation, of electronic circuits provided for a concrete purpose, for example, for high frequency signal processing or for providing an interface. The corresponding module can thus, depending on application, comprise corresponding analog circuits for producing, and/or processing, corresponding analog signals. The module can, however, also comprise digital circuits, such as FPGAs, microcontrollers or storage media in conjunction with corresponding programs. In such case, the program is designed to perform the required method steps, or to apply the needed computer operations. In this context, different electronic circuits of the module can, within the scope of the invention, potentially also use a shared physical memory, or be operated by means of the same physical, digital circuit. In such case, it does not matter whether different electronic circuits are arranged within the module on a shared circuit board or on a number of connected circuit boards.

BRIEF DESCRIPTION OF THE DRAWINGS

The present disclosure will be explained in more detail with reference to the following figures.

The present disclosure will now be explained in greater detail based on the appended drawing, the figures of which show as follows.

DETAILED DESCRIPTION

Figure 1:
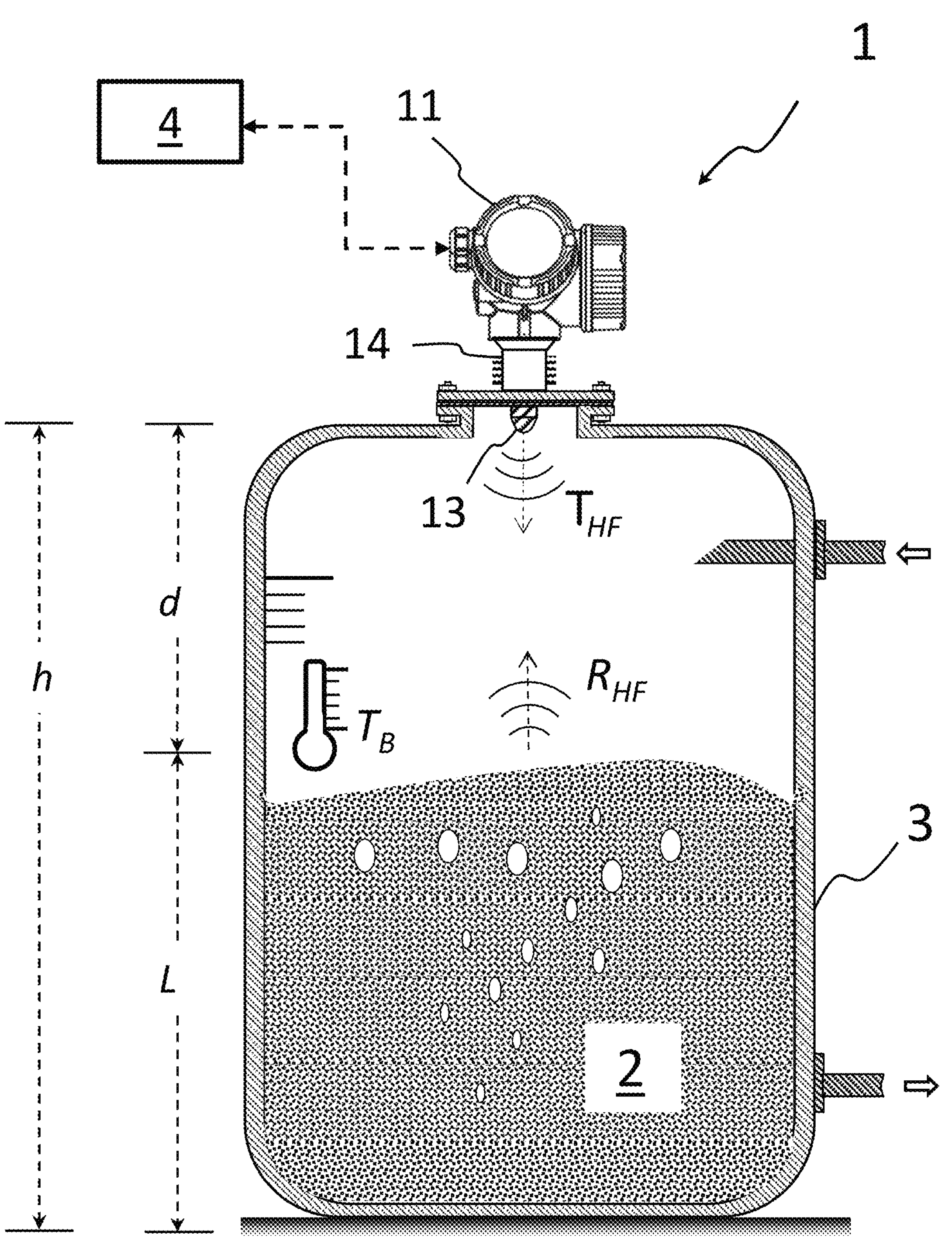
FIG. 1 shows a radar based, fill level measuring device mounted on a container.

For an understanding of the fill level measuring device 1 of the invention in principle, FIG. 1 shows a fill substance 2 in a container 3. The fill level L of the fill substance is to be determined. The container 3 can, depending on type of fill substance 2 and depending on field of application, rise to greater than 100 m high. The conditions in the container 3 depend on the type of fill substance 2 and the field of application. For example in the case of exothermic reactions, excessive temperature- and pressure loading can occur. In the case of dust containing or flammable materials, appropriate explosion protection conditions must be maintained in the interior of the container.

As a rule, the fill level measuring device 1 is connected via a separate interface unit, such as, for instance, one based on "4-20 mA", "PROFIBUS", "HART", or "Ethernet", to a superordinated unit 4, such as e.g. a local process control system or a decentral server system. In this way, the measured fill level value L can be communicated, for example, in order, in given cases, to control in- and/or outgoing flows of the container 3. However, also other information concerning the general operating state of the fill level measuring device 1 can be communicated.

In order to be able to ascertain the fill level L independently of the reigning conditions, the fill level measuring device 1 is mounted above the fill substance 2 at a known, installed height h over the base of the container 3. In such case, the fill level measuring device 1 is secured, and oriented, at an appropriate opening of the container 3 pressure- and media-tightly in such a manner that an antenna 13 of the fill level measuring device 1 is directed in the container 3 vertically downwards toward the fill substance 2, while the additional components 11, 14 of the fill level measuring device 1 are arranged outside of the container 3.

Transmitted radar signals $T_{HF}$ are transmitted via the antenna 13 in the direction of the surface of the fill substance 2. After reflection on the fill substance surface, the fill level measuring device 1 receives the reflected radar signals $R_{HF}$, in turn, via the antenna 13. In such case, the signal travel time t between transmitting and receiving the respective radar signals $T_{HF}$, $R_{HF}$ is proportional to the separation d between the fill level measuring device 1 and the fill substance 2 according to the formula $$t = \frac{2*d}{c}$$

wherein c stands for the radar-propagation velocity, which corresponds to the speed of light. The signal travel time t can be determined by the fill level measuring device 1, for example, by means of the FMCW method or by means of the pulse travel time method. Correspondingly, the fill level measuring device 1 can determine the separation d, for example, based on a calibration relating measured travel time t with separation d. The fill level measuring device 1 can then, in turn, determine the fill level L according to the formula $$d = h - L$$

when the installed height h is provided in the fill level measuring device 1. Serving for determining the signal travel time t, and, thus, the fill level L based on the received signal $R_{HF}$ is a correspondingly designed transmitting/receiving unit 12 of the fill level measuring device 1, where, for example, the FMCW- or the pulse travel time, measuring principle is implemented. Moreover, the transmitting/receiving unit 12 serves for producing the transmitted radar signals $S_{HF}$. In the case of the embodiment shown in FIG. 2 and FIG. 3, the transmitting/receiving unit 12 is arranged within the device housing 11, for example, embodied as a monolithically encapsulated SMD component on a side of a circuit board facing toward the antenna 13.

FIG. 1 illustrates that the housing 11 of the fill level measuring device 1 is spaced from the antenna 13 and from the container 3 via a measuring device neck 14, in order to decouple the transmitting/receiving unit 12 accommodated in the housing 11 thermally from the container interior. Therefore, the antenna 13 is coupled with the transmitting/ receiving unit 12 via a hollow conductor 141, which extends from the transmitting/receiving unit 12 orthogonally relative to the circuit board and along the axis of the measuring device neck 14. In such case, the hollow conductor 141 is made of metal, such as, for example, stainless steel, for the purpose of providing both high frequency-conductivity and mechanical stability.

Apart from the end regions of the hollow conductor 141, hollow conductor 141 is so dimensioned that the hollow conductor 141 is spaced from the wall of the measuring device neck 14. The resulting hollow space thermally insulates the hollow conductor 141 in the region of the hollow space from the measuring device neck 14.

Figure 3:
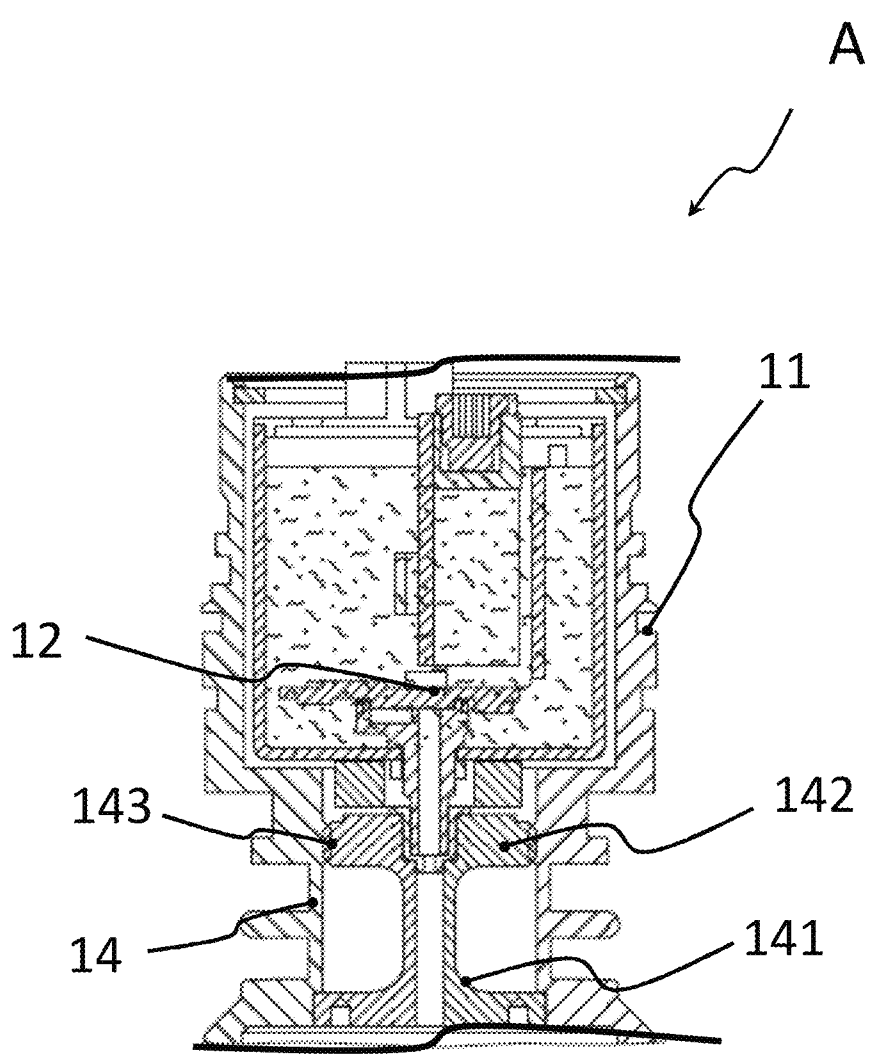
FIG. 3 shows an enlarged detail of the sectional view in the region of the measuring device neck.

As especially visible in the enlarged view of FIG. 3, the hollow conductor 141 includes as monolithic component at the end region facing the transmitting-receiving unit 12 a thermal coupling element 142 thermally coupling to the inner surface of the measuring device neck 14. Advantageously, this improves thermal decoupling of the transmitting/receiving unit 12 from the container 3. In this way, the measuring device neck 14 can be designed shorter, without the danger that the transmitting/receiving unit 12, in given cases, becomes thermally overloaded. Thus, the fill level measuring device 1 can be designed, as a whole, compactly. In the case of the embodiment of the fill level measuring device 1 of the invention shown in FIG. 3, the hollow conductor 141 is, moreover, secured in the measuring device neck 14 via the coupling element 142, in that the coupling element 142 is provided on the outer side with an external screw thread. In such case, the measuring device-neck 14 includes a corresponding internal screw thread in its interior, in order to establish a corresponding screwed connection 143. Thus, there is no need for an additional securing of the hollow conductor 141 in the measuring device neck 14.

Figure 2:
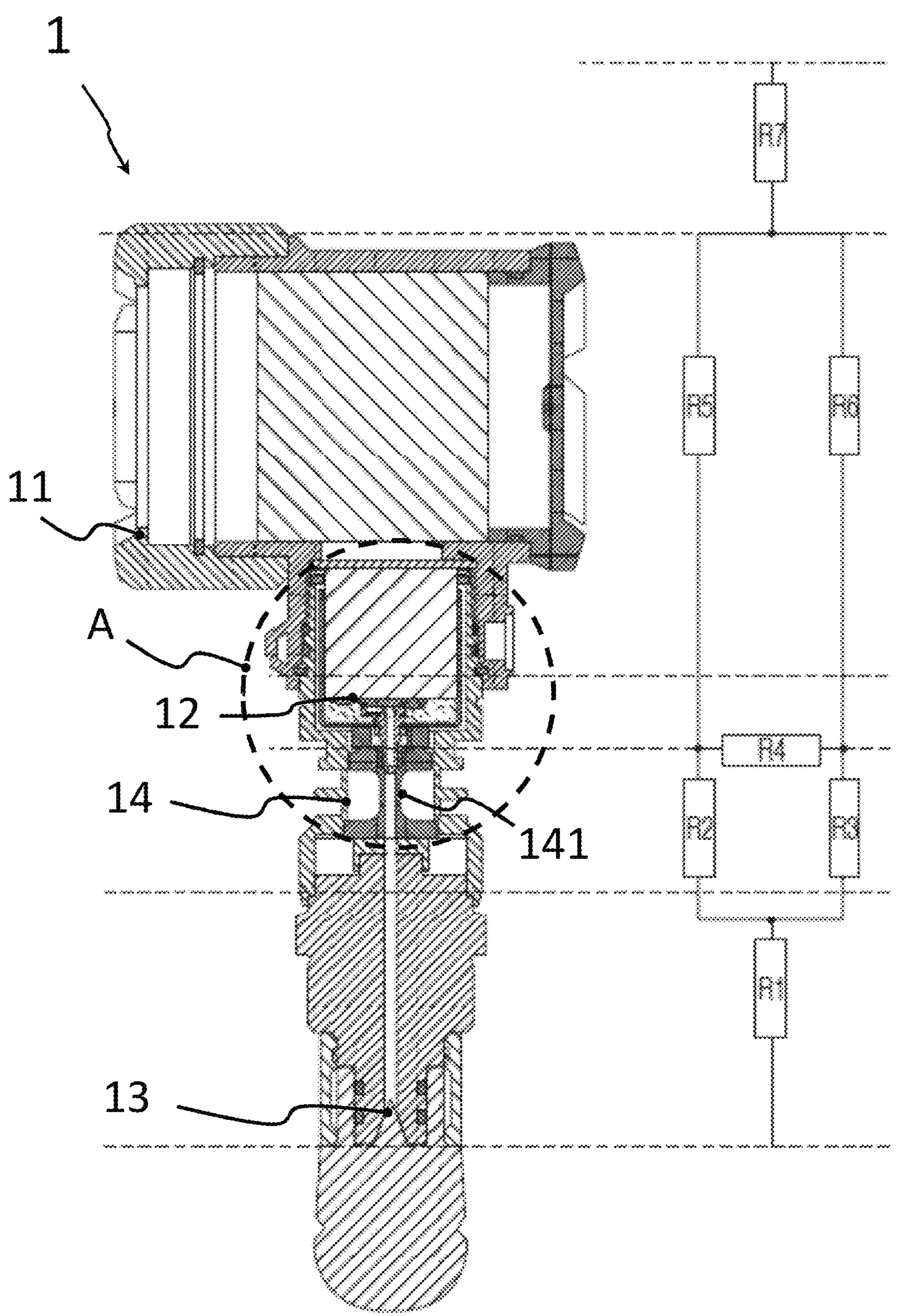
FIG. 2 shows a sectional view of the fill level measuring device of the present disclosure.

Operation of the thermal coupling element 142 can be better understood based on the equivalent circuit in FIG. 2, wherein the thermal resistances in Kelvin/Watt of the following components are taken into consideration:

R1: Thermal resistance in the antenna 13

R2: Thermal resistance in the hollow conductor 141

R3: Thermal resistance of the measuring device neck 14

R4: Thermal resistance of the coupling element 142

R5: Thermal resistance transmitting/receiving unit 12-housing 11

R6: Thermal resistance in the housing 11

R7: Thermal resistance housing 11 to the environment

The equivalent circuit makes clear that there are potentially two parallel paths, R3 in series with R6 as well as R2 in series with R5, for transferring heat-energy from the container interior. In such case, it is assumed that the entire heat-energy is in-coupled via the antenna 13 and out-coupled via the housing 11, such that the thermal resistances R1, R7 connect in series respectively in front of and after the parallel paths. For an optimum heat-transfer, the thermal transition resistance R7 from the housing 11 to environment should be as small as possible, in order to keep the temperature at the transmitting/receiving unit 12 low enough. Decisive for the value of thermal resistance R7 are the housing surface and the material of the housing 11, wherein a value around 2 K/W can be achieved. Because the antenna 11 for its function must have a defined size and be made of a metal material, its thermal resistance R1 is essentially fixed and has with values around about 4 K/W a relatively high thermal conductivity.

In the case of the first parallel path between R1 and R7, thus between the antenna 13 and the housing 11, involved are the thermal resistances R3, R6 of the measuring device neck 14 and the following housing 11, wherein the two resistances have a comparatively small thermal resistance of less than 10 K/W.

The second parallel path is formed by the thermal resistance R2 in the hollow conductor 141 to the transmitting/receiving unit 12 and the following resistance R5 from the transmitting/receiving unit 12 via the housing interior to the housing 11. In such case, the hollow conductor 141 has due its required metal design and required minimum cross sectional area a relatively low thermal resistance R2 of below 100 K/W, while thermal resistance of the transmitting/receiving unit 12 to the housing 11 is, in comparison, very high with values around 150 K/W.

Because the thermal resistance R5 from the transmitting/receiving unit 12, of all resistances R1-R7, has the greatest value, this leads in connection with the thermal conductivity of the hollow conductor 141 to a corresponding heat-buildup in the housing 11. Without the thermal coupling element 142, the temperature at the transmitting/receiving unit 12 amounts to about 70° C. in the case of a temperature of 150° C. in the container 3 and an outside temperature of 20° C. With coupling element 142, the temperature at the transmitting/receiving unit 12 is reduced to about 55° C. In the equivalent circuit, this is expressed by the fact that the two parallel paths are connected together between R2 and R5, and R3 and R6, by the thermal resistance R4 of the coupling element 142. Thus, the high thermal resistance of R5 is mostly bypassed via the low thermal resistance of R6. In this connection, it is sensible to design such that the coupling element 142 and the surface of the housing 11 have, in each case, a thermal resistance R4, R6, which in total amounts in maximum to a fifth of the thermal resistance R5 of the transmitting/receiving unit 12 toward the housing 11. In order to achieve a temperature of about 55° C. without the coupling element 142, it would be necessary to lengthen the measuring device neck 14 correspondingly, such that its thermal resistance R3 as well as the resistance R2 of the hollow conductor 141 increase. This, however, works to prevent a compact construction.

The invention claimed is:

1. A fill level measuring device for determining a fill level of a fill substance in a container, comprising:

a housing;

a transmitting/receiving unit arranged in the housing and designed to produce transmitted radar signals and, based on corresponding received signals, to determine the fill level;

an antenna for transmitting transmitted radar signals to the fill substance and/or for receiving received signals after reflection on a surface of the fill substance;

a measuring device neck arranged between the antenna and the housing;

a hollow conductor via which signals are led between the transmitting/receiving unit and the antenna, wherein the hollow conductor is disposed within the measuring device neck and extends in the measuring device neck; and a thermal coupling element disposed within the measuring device neck and embodied to couple the hollow conductor mechanically and thermally with the measuring device neck, wherein the thermal coupling element is monolithic having: a first end extending radially from the hollow conductor to the measuring device neck; a second end extending radially from the hollow conductor to the measuring device neck; and a mid-section between the first end and the second end having a radius not extending to the measuring device neck thereby providing an insulating space between the first end, the second end, and the measuring device neck.

2. The fill level measuring device as claimed in claim 1, wherein the thermal coupling element is arranged at an end region of the hollow conductor, or of the housing-neck, facing toward the transmitting/receiving unit.

3. The fill level measuring device as claimed in claim 2, wherein the thermal coupling element and the measuring device neck comprise corresponding screw threads via which the hollow conductor is securable in the measuring device neck.

4. The fill level measuring device as claimed in claim 1, wherein the thermal coupling element has a thermal resistance that amounts to a maximum of 15 Kelvin/Watt.

5. The fill level measuring device as claimed in claim 4, wherein the thermal coupling element and the housing have each a thermal resistance, when summed together, amounts at most to a fifth of a thermal resistance of the transmitting/receiving unit toward the housing.

6. The fill level measuring device as claimed in claim 5, wherein the housing has a thermal resistance amounting to 5 K/W maximum.

7. The fill level measuring device as claimed in claim 1, wherein the transmitting/receiving unit produces radar signals with a frequency of at least 60 GHz, and processes corresponding received signals.

* * * * *